(12) United States Patent
Satapati

(10) Patent No.: US 7,685,290 B2
(45) Date of Patent: Mar. 23, 2010

(54) METHOD AND APPARATUS FOR HANDLING SCTP MULTI-HOMED CONNECTIONS

(75) Inventor: Suresh Satapati, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 1583 days.

(21) Appl. No.: 10/946,995

(22) Filed: Sep. 21, 2004

(65) Prior Publication Data

US 2006/0062203 A1    Mar. 23, 2006

(51) Int. Cl.
G06F 15/16    (2006.01)

(52) U.S. Cl. .................. 709/227; 709/203; 709/218; 709/231; 709/220; 709/230; 709/245; 709/222; 370/351; 370/352; 370/389

(58) Field of Classification Search ......... 709/227–230, 709/203, 218, 231, 220, 239, 222, 245
See application file for complete search history.

(56) References Cited

U.S. PATENT DOCUMENTS 7,284,068 B1 * 10/2007 Ramalho ............... 709/245
2006/0018301 A1 * 1/2006 Schrufer ............... 370/351
2006/0174039 A1 * 8/2006 Stewart et al. ............ 709/245

OTHER PUBLICATIONS

R. Stewart, et al., "Stream Control Transmission Protocol," Copyright The Internet Society. RFC 2960. pp. 1-105, Oct. 1, 2000.

L. Coene, et al., "Stream Control Transmission Protocol Applicability Statement," RFC 3257. pp. 1-11, Apr. 1, 2002.

S. Jayasenan, et al., "Stateful Network Address Translation Protocol Implemented Over a Data Network," U.S. Appl. No. 09/735,199, filed Dec. 11, 2000.

* cited by examiner

Primary Examiner—Jude Jean-Gilles
(74) Attorney, Agent, or Firm—Weaver Austin Villeneuve & Sampson LLP

(57) ABSTRACT

Disclosed are methods and apparatus for reliably handling Stream Control Transmission Protocol (SCTP) multi-homed connections across multiple translation (e.g., NAT devices), such that messages sent between endpoints, which include one or more multi-homed devices, reach their intended destination. In one embodiment, a method for handling SCTP multi-homed connections across multiple translation devices is disclosed. When an SCTP association between two hosts is being established through a particular translation device, multi-homing information for one or both of the hosts is communicated from the particular translation device to one or more other translation devices which are associated with the particular translation device. This is done so that the one or more other translation devices can store the received multi-homing information and when data is received at the one or more translation devices for the established SCTP association between the two hosts, the data is then caused to be sent to its intended destination based on the stored multi-homing information. The multi-homing information is also stored for the particular translation device. When data is received at the particular translation device for the established SCTP association between the two hosts, the data is caused to be sent to its intended destination based on the multi-homing information.

28 Claims, 8 Drawing Sheets

FIG. 6A

| | PRIVATE | | | | | PUBLIC | | | |
|---|---|---|---|---|---|---|---|---|---|
| Protocol | Source Address | Destination Address | Source Port | Destination Port | Protocol | Source Address | Destination Address | Source Port | Destination Port |
| SCTP | 10.1.1.1 | 128.1.1.1 | 1024 | 80 | SCTP | 170.1.1.1 | 128.1.1.1 | 1024 | 80 |
| SCTP | 10.3.1.1 | 128.1.1.1 | 1024 | 80 | SCTP | 190.1.1.1 | 128.1.1.1 | 1024 | 80 |

FIG. 6B

| | PRIVATE | | | | | PUBLIC | | | |
|---|---|---|---|---|---|---|---|---|---|
| Protocol | Source Address | Destination Address | Source Port | Destination Port | Protocol | Source Address | Destination Address | Source Port | Destination Port |
| SCTP | 10.1.1.1 | 128.1.1.1 | 1024 | 80 | SCTP | 170.1.1.1 | 128.1.1.1 | 1024 | 80 |
| SCTP | 10.3.1.1 | 128.1.1.1 | 1024 | 80 | SCTP | 190.1.1.1 | 128.1.1.1 | 1024 | 80 |
| SCTP | 10.1.1.1 | 128.1.1.2 | 1024 | 80 | SCTP | 170.1.1.1 | 128.1.1.2 | 1024 | 80 |
| SCTP | 10.3.1.1 | 128.1.1.2 | 1024 | 80 | SCTP | 190.1.1.1 | 128.1.1.2 | 1024 | 80 |

US 7,685,290 B2

METHOD AND APPARATUS FOR HANDLING SCTP MULTI-HOMED CONNECTIONS

BACKGROUND OF THE INVENTION

The present invention relates to methods and apparatus for processing data within a computer network. More specifically, it relates to mechanisms for handling SCTP (Stream Control Transmission Protocol) Multi-homed connections, especially across multiple NAT (network address translation) or PAT (port address translation) devices.

SCTP is a reliable transport protocol which along with TCP (Transmission Control Protocol), UDP (User Datagram Protocol), and RTP (Real-Time Transport Protocol) provides transport layer services for upper layer protocols and services. One of the important capabilities of SCTP, and which is not provided by TCP, is Multi-Homing. SCTP provides transparent support for communications between two endpoints of which one or both is multi-homed, wherein an endpoint has a primary address and one or more alternative addresses through which it may be accessed by other endpoints. SCTP provides monitoring of the reachability of the addresses on the remote endpoint and in the case of failure can transparently failover from the primary address to an alternate address, without upper layer intervention.

This capability can be used to build redundant paths between two SCTP endpoints and can be particularly useful for applications that seek transport-level fault tolerance. Achieving path redundancy between two SCTP endpoints normally requires that the two endpoints are equipped with multiple interfaces assigned with multiple addresses and that routing is configured appropriately.

Path failure detection mechanisms for SCTP are described in detail in Section 8.2 of RFC 2960, entitled "Stream Control Transmission Protocol", Network Working Group of Internet Engineering Task Force (IETF), October 2000, which document is herein incorporated by reference in its entirety. This RFC document states that an SCTP endpoint shall monitor the reachability of the idle destination transport address(es) of its peer by sending a HEARTBEAT chunk periodically to the destination transport address(es). If there are no corresponding HEARTBEAT-ACK chunks received and if the number of retransmission attempts of HEARBEAT chunks exceeds a certain threshold, the endpoint then should mark the destination transport address as inactive. When the primary path is marked inactive (due to excessive retransmissions, for instance), the sender may automatically transmit new packets to an alternate destination address if one exists and is active. If more than one alternate address is active when the primary path is marked inactive only one transport address should be chosen and used as the new destination transport address.

The SCTP Applicability Statement describes a multi-homed scenario where one end-point 102 is behind a single NAT device 104 as shown in FIG. 1. For example, another endpoint 108 may communicate with endpoint 102 via Internet 106 and NAT device 104.

For a particular computer to communicate with other computers or web servers within a network (e.g., the Internet), the particular computer must have a unique IP address. IP protocol version 4 specifies 32 bits for the IP address, which theoretically gives about 4,294,967,296 unique IP addresses. However, there are actually only between 3.2 and 3.3 billion available IP addresses since the addresses are separated into classes and set aside for multicasting, testing and other special uses. With the explosion of the Internet, the number of IP addresses is not enough to give each computer a unique IP address.

One solution for addressing computers with the limited number of IP addresses is referred to as network address translation (NAT). NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may duplicate IP address that are used outside of the local network. When a local computer attempts to communicate with a computer outside the local network, the intermediary device matches the local computer's local IP address (and port) to one of the intermediary device's assigned IP addresses (and ports). The intermediary device then replaces the local computer's local address (and port) with the matched assigned IP address (and port). This matched assigned IP address (and port) is then used to communicate between the local computer and the outside computer. Thus, NAT techniques allow IP address to be duplicated across local networks.

The above referenced Applicability Statement describes how to handle messages sent through a single NAT device, as shown in FIG. 1, and such description is further described in RFC 3257, entitled "Stream Control Transmission Protocol Applicability Statement", Network Working Group of Internet Engineering Task Force (IETF), April 2002, which document is herein incorporated by reference in its entirety. RFC3257 proposes the following to deal with the above scenario:

"The NAT must have a public IP address for each represented internal IP address. The host can preconfigure an IP address that the NAT can substitute, or, the NAT can have internal Application Layer Gateway (ALG) which will intelligently translate the IP addresses in the INIT and INIT ACK chunks." For the Overload (PAT) case: "If Network Address Port Translation is used with a multihomed SCTP endpoint, then any port translation must be applied on a per-association basis such that an SCTP endpoint continues to receive the same port number for all messages within a given association."

The assumption in the above scenario is that IP Routing is set up in such a way that packets destined to the primary and "secondary" address of the multi-homed endpoint traverse the same NAT.

But more often in a multi-homed scenario, the above is not true. Packets destined to the "secondary" address may be traversing an entirely different path where there may be a different NAT device along that path. This scenario is illustrated in FIG. 2, wherein a first Host A 202 may be reached along two different paths. A first path passes through a first NAT1 device 204, while a second path passes through a second different NAT2 device 206. Thus, another host, such as Host B (210), may communicate with Host A (202) through, for example, the path through NAT1 device 204 or the path through NAT2 device 206 via the Internet 208, for example.

SCTP association will fail in the above scenario, when Host B (210) sends packets to the secondary address of Host A (202) through NAT2 (206), rather than NAT1 (204). NAT2 device does not have the intelligence to allow the packets destined to Host A's (202) secondary address.

In view of the above, there is a need for improved mechanisms for reliably handling SCTP multi-homed connections across multiple NAT devices.

SUMMARY OF THE INVENTION

Accordingly, the present invention provides methods and apparatus for reliably handling Stream Control Transmission Protocol (SCTP) multi-homed connections across multiple translation (e.g., NAT devices), such that messages sent between endpoints, which include one or more multi-homed devices, reach their intended destination. In one embodiment, a method for handling SCTP multi-homed connections across multiple translation devices is disclosed. When an SCTP association between two hosts is being established through a particular translation device, multi-homing information for one or both of the hosts is communicated from the particular translation device to one or more other translation devices which are associated with the particular translation device. This is done so that the one or more other translation devices can store the received multi-homing information and when data is received at the one or more translation devices for the established SCTP association between the two hosts, the data is then caused to be sent to its intended destination based on the stored multi-homing information. The multi-homing information is also stored for the particular translation device. When data is received at the particular translation device for the established SCTP association between the two hosts, the data is caused to be sent to its intended destination based on the multi-homing information.

In one implementation aspect, a transport control protocol (TCP) connection is established between the particular translation device and the one or more other translation devices prior to the operation of communicating multi-homing information. In another aspect, when receiving a shutdown or abort message from one of the two hosts for the SCTP association, the stored multi-homing information is removed. In a further aspect, the one or more other translation devices and the particular translation device are associated together because they are all coupled with one of the two hosts between which the SCTP association is being established.

In a specific implementation, the multi-homing information includes a plurality of private addresses and a plurality of corresponding public addresses for one of the two hosts. In another implementation, the multi-homing information includes a private address and a corresponding public address and a plurality of private port numbers and a plurality of corresponding public port values for one of the two hosts.

In a further implementation, when an INIT message is received at the particular translation device during establishment of the SCTP association between the two hosts, the header of the INIT message is translated and the optional field of the INIT message is translated if present and translatable by the particular receiving translation device. After translation, the translated INIT message is forwarded to its intended destination. When an INIT-ACK message is received at the particular translation-device during establishment of the SCTP association between the two hosts, the header INIT message is translated and the is optional field of the INIT-ACK is translated if present and translatable by the particular translation device. After translation, the translated INIT-ACK message is forwarded to its intended destination.

In a specific implementation, translating the header and optional field of the INIT message and INIT-ACK message are each accomplished by translating between a primary private address and a primary public address and between one or more secondary private addresses and one or more secondary public addresses. The multi-homing information is stored in the form of a first entry in a session table having fields comprising the primary private address and the corresponding primary public address and a second one or more entries comprising the one or more secondary private addresses and the one or more corresponding secondary public addresses.

In yet another implementation, translating the header and optional field of the INIT message and INIT-ACK message are each accomplished by translating between a primary private port and a primary public port and between one or more secondary private ports and one or more secondary public ports. The multi-homing information is stored in the form of a first entry in a session table having fields comprising the primary private port and the corresponding primary public port and a second one or more entries comprising the one or more secondary private ports and the one or more corresponding secondary public ports.

In either implementation, the multi-homing information is communicated from the particular translation device to the one or more other translation devices by populating the session table from the particular translation device to the one or more other translation devices.

In another embodiment, the invention pertains to a computer system operable to handle SCTP multi-homed connections across multiple translation devices. The computer system includes one or more processors and one or more memory. At least one of the memory and processors are adapted to provide at least some of the above described method operations. In yet a further embodiment, the invention pertains to a computer program product for handling SCTP multi-homed connections across multiple translation devices. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

FIG. 6A illustrates a Session Table having entries corresponding, to an SCTP session between the hosts of FIG. 3, where Host A is multi-homed, in accordance with a specific implementation of the present invention.

FIG. 6B illustrates a Session Table having entries corresponding to an SCTP session between the hosts of FIG. 3, where both host A and B are multi-homed, in accordance with a specific implementation of the present invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
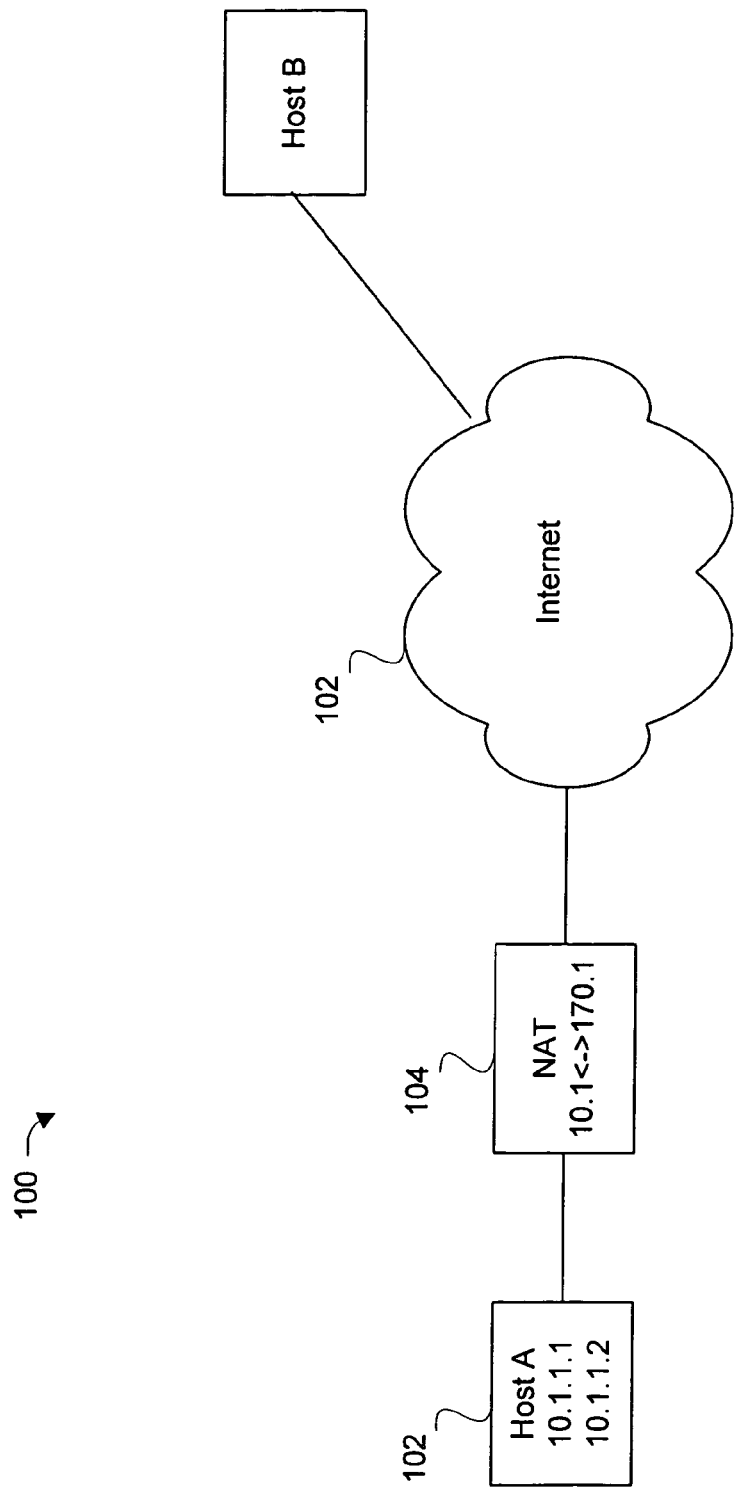
FIG. 1 is a diagrammatic representation of a network implementing multi-homing SCTP connections through a single NAT device.
Figure 2:
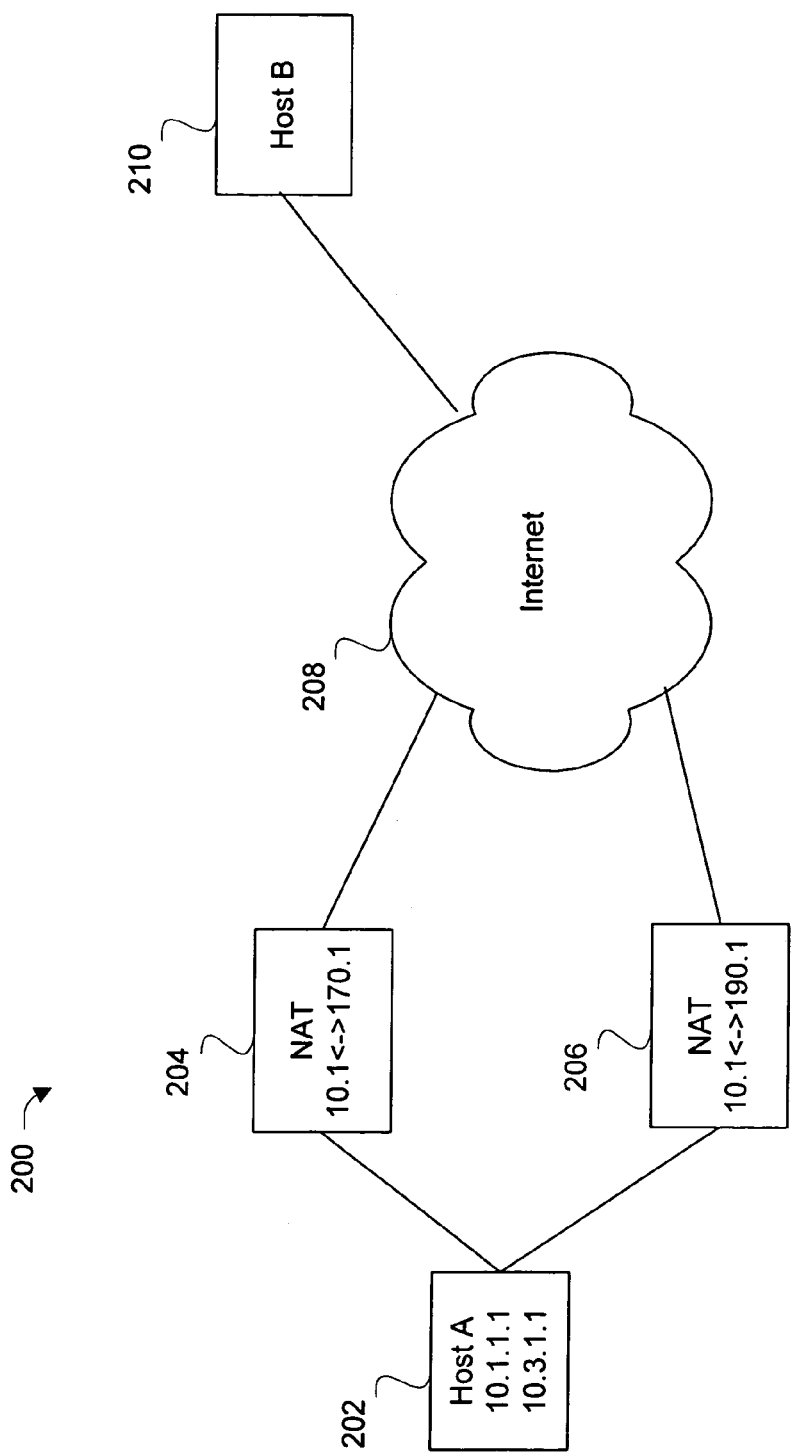
FIG. 2 is a diagrammatic representation of a network implementing multi-homing SCTP connections across multiple NAT devices.
Figure 3:
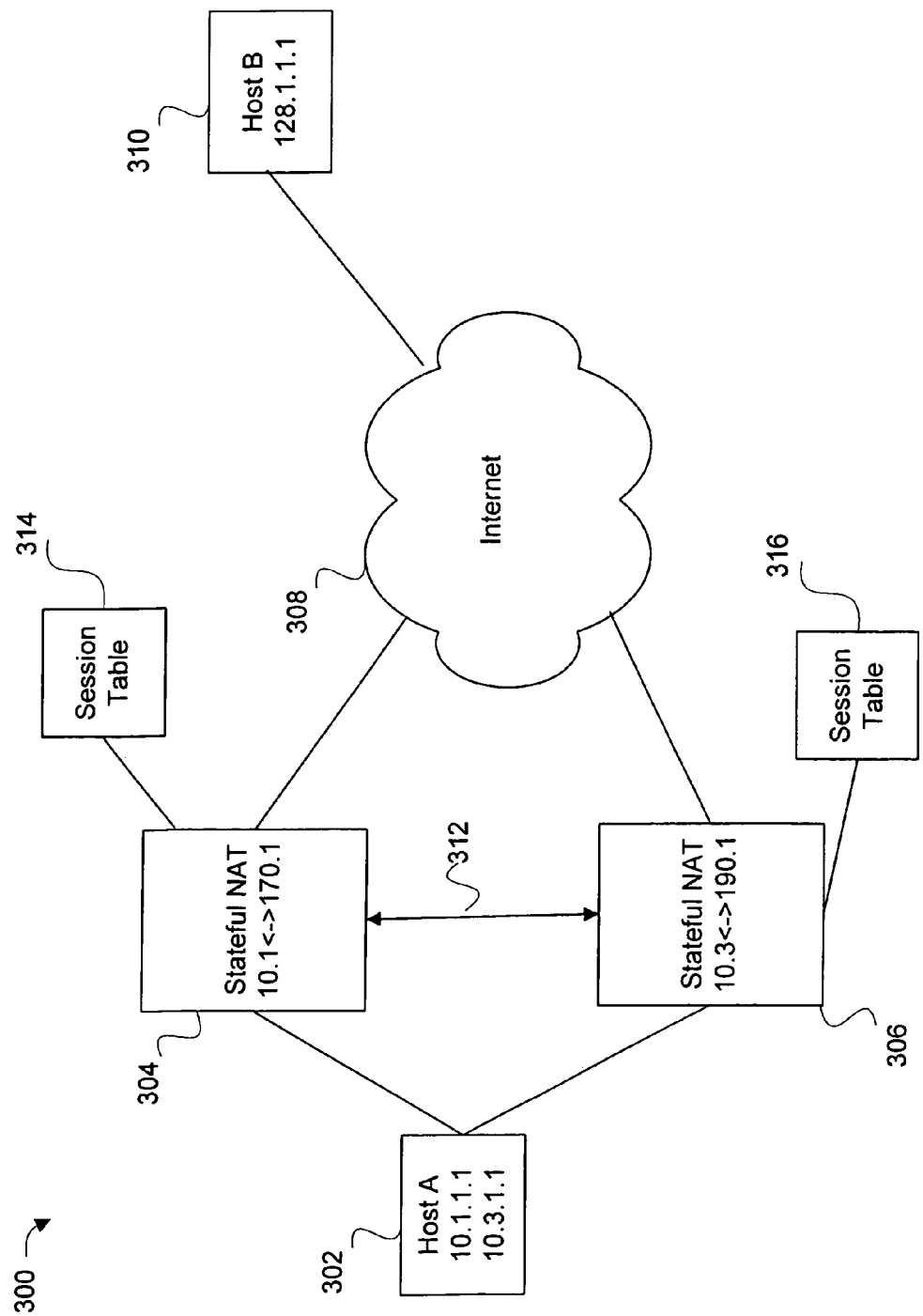
FIG. 3 is a diagrammatic representation of a network implementing multi-homing SCTP connections across multiple stateful NAT devices in accordance with one embodiment of the present invention.

FIG. 3 is a diagrammatic representation of a network 300 in which techniques of the present invention may be implemented in accordance with one embodiment of the present invention. As shown, the network 300 includes a plurality of devices interconnected via a wide area network (WAN) 308, such as the Internet. As shown, host A 302 is coupled with two Stateful NAT devices 304 and 306. In general, each stateful NAT is configured to retain and share relevant information with other stateful NAT's as described further below. In the present invention, multi-homing information is retained and shared between the stateful NAT devices. Each stateful NAT device may also be configured to retain and share other useful information as further described in co-pending U.S. patent application Ser. No. 09/735,199, entitled "STATEFUL NETWORK ADDRESS TRANSLATION PROTOCOL IMPLEMENTED OVER A DATA NETWORK", filed 11 Dec. 2000 by Siva S. Jayasenan et al., which application is incorporated herein by reference in its entirety.

Although the term "NAT device" is used herein as an exemplary device in which the techniques of the present invention may be implemented, any suitable type of translation device may be used besides a network address translation device. For example, a network address port translation (NAPT-PT) device may be utilized instead.

Referring to the illustrated embodiment, each NAT device may, for example, be associated with a particular provider network (not shown). Any number of other hosts may communicate with Host A via Internet and either NAT device 304 or NAT device 306. That is, Host A is reachable from two different paths or addresses. In the illustrated embodiment, Host A can use private address 10.1.1.1 or 10.3.1.1 for SCTP connections, which are translated into public addresses by either NAt device 304 or 306 as further described below.

Additionally, WAN 106 may include any number and type of network elements, routers, NAT or NAPT-PT devices, devices, clients, servers, and devices. Each stateful NAT device 304 and 306 may utilize any suitable number and type of data structures for facilitating their operations as described herein. In one embodiment, each NAT device may also have an associated address pool table 114 having available translation addresses for host A 302, as well as any other associated hosts, and a session table, e.g., 314 and 316, for tracking bindings between private and public addresses as related to each SCTP session.

Figure 4:
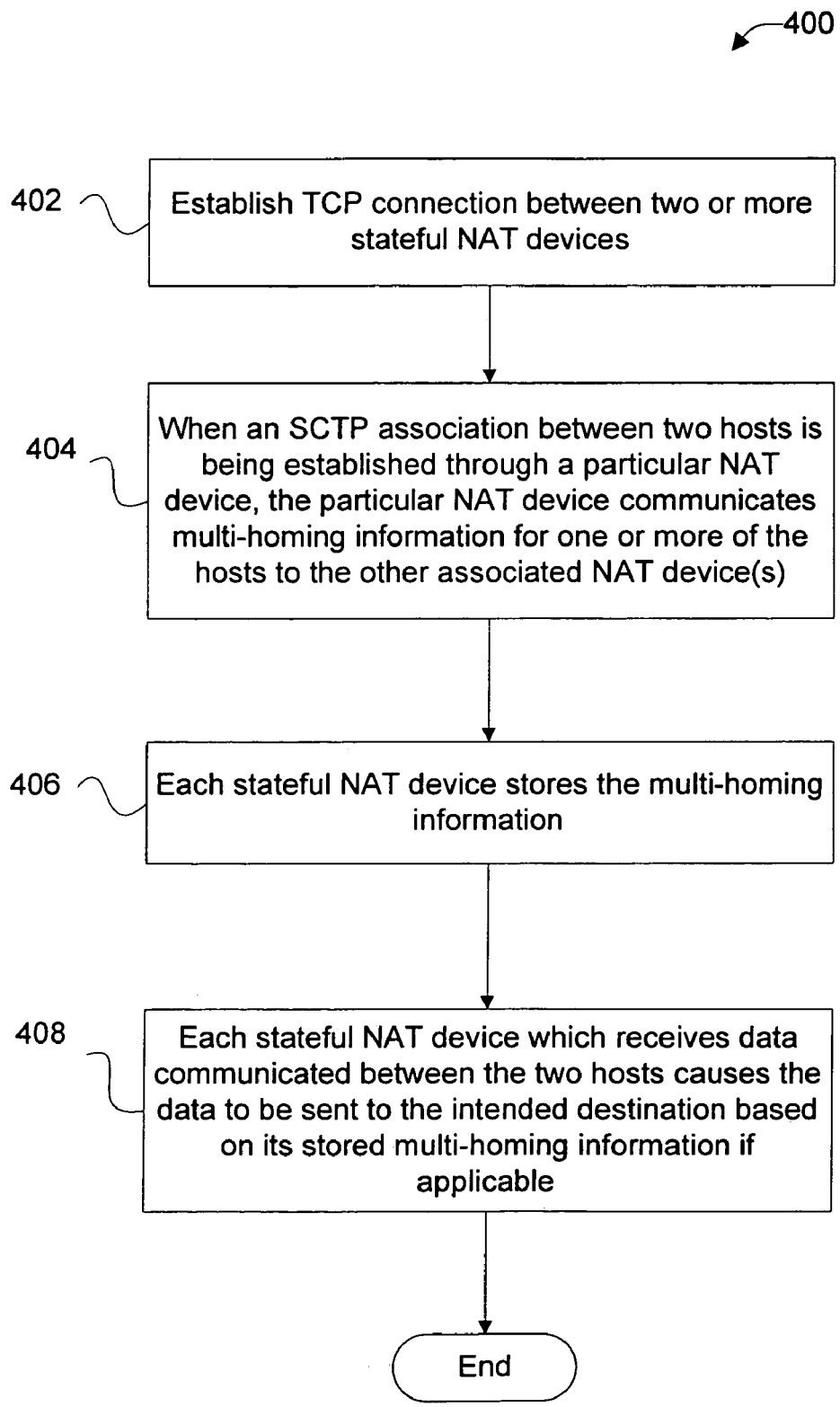
FIG. 4 is a flowchart illustrating a procedure for handling an SCTP multi-homed connection across multiple NAT devices in accordance with one embodiment of the present invention.

In general, each stateful NAT device is configured to handle SCTP multi-homed sessions even when alternative paths through other NAT devices are used during a particular session. FIG. 4 is a flowchart illustrating a procedure 400 for handling an SCTP multi-homed connection across multiple NAT devices in accordance with one embodiment of the present invention. Initially, a TCP connection may be established between two or more stateful NAT devices in operation 402. That is, handshaking messages are sent between two or more associated stateful NAT devices. In the illustrated example of FIG. 3, a TCP session is established between stateful NAT devices 304 and 306. Any number of stateful NAT devices may be associated together based on any suitable criteria. In one embodiment, the NAT devices which are coupled with a particular host are associated together and configured to initiate a TCP connection upon startup. In a less preferred alternative embodiment, the TCP session may be established during a later time in the flow described below.

After a TCP connection is established between the associated two or more stateful NAT devices and when an SCTP association between two hosts is being established through a particular NAT device, the particular NAT device communicates multi-homing information for one or more of the hosts (if present) to the other associated NAT devices in operation 404. Operation 404 is further described below with reference to FIG. 5. With reference to FIG. 3, when an SCTP association is being established between Host B and Host A through NAT device 304 and Host A indicates multi-homing capabilities, this NAT device 304 then sends the indicated multi-homing information for Host A to the other NAT device 306. In contrast, when an SCTP association is being established between Host B and Host A through NAT device 306, NAT device 306 then sends the indicated multi-homing information for Host A to the other NAT device 304. Of course, if Host B indicates multi-homing during establishment of the SCTP association, the indicated multi-homing information for Host B may also be communicated from the initializing NAT device to the other associated NAT device.

Each stateful NAT device then stores the multi-homing information of the established SCTP association in operation 406. For example, each NAT device stores the multi-homing addresses and ports, along with their respective translation addresses, in a Session Table (e.g., 314 and 316 of FIG. 3). Each multi-homing address (or port) may correspond to the same or a different interface of the host. Operation 406 is further described below with reference to FIG. 5.

After an SCTP associate is established and multi-homing information is retained by each associated NAT device and when a particular NAT device receives data communicated between the two hosts during the SCTP connection, the receiving NAT device then causes the data to be sent to the destination host based on the stored multi-homing address information if applicable in operation 408. In one implementation of the SCTP protocol, each host of a particular SCTP session may periodically send a HEARTBEAT chunk to the currently used multi-homing address (or port) of the other host. If a HEARTBEAT-ACK chunk is not received after a particular number of retries or alternatively within a certain period of time, then it is determined that the current multi-homing address (or port) is invalid or no longer operable. Any other words, the current path has failed. In this case, a secondary multi-homing address (or port) may then be utilized. Since the NAT devices along either path are configured to communicate multi-homing information to each other and retain such information, each stateful NAT can then translate incoming data from their respective paths. In the example of FIG. 3, NAT device 304 translates data for private address 10.1.1.1 (or public address 170.1.1.1), while NAT device 306 translates data for private address 10.3.1.1 (or public address 190.1.1.1).

Figure 5:
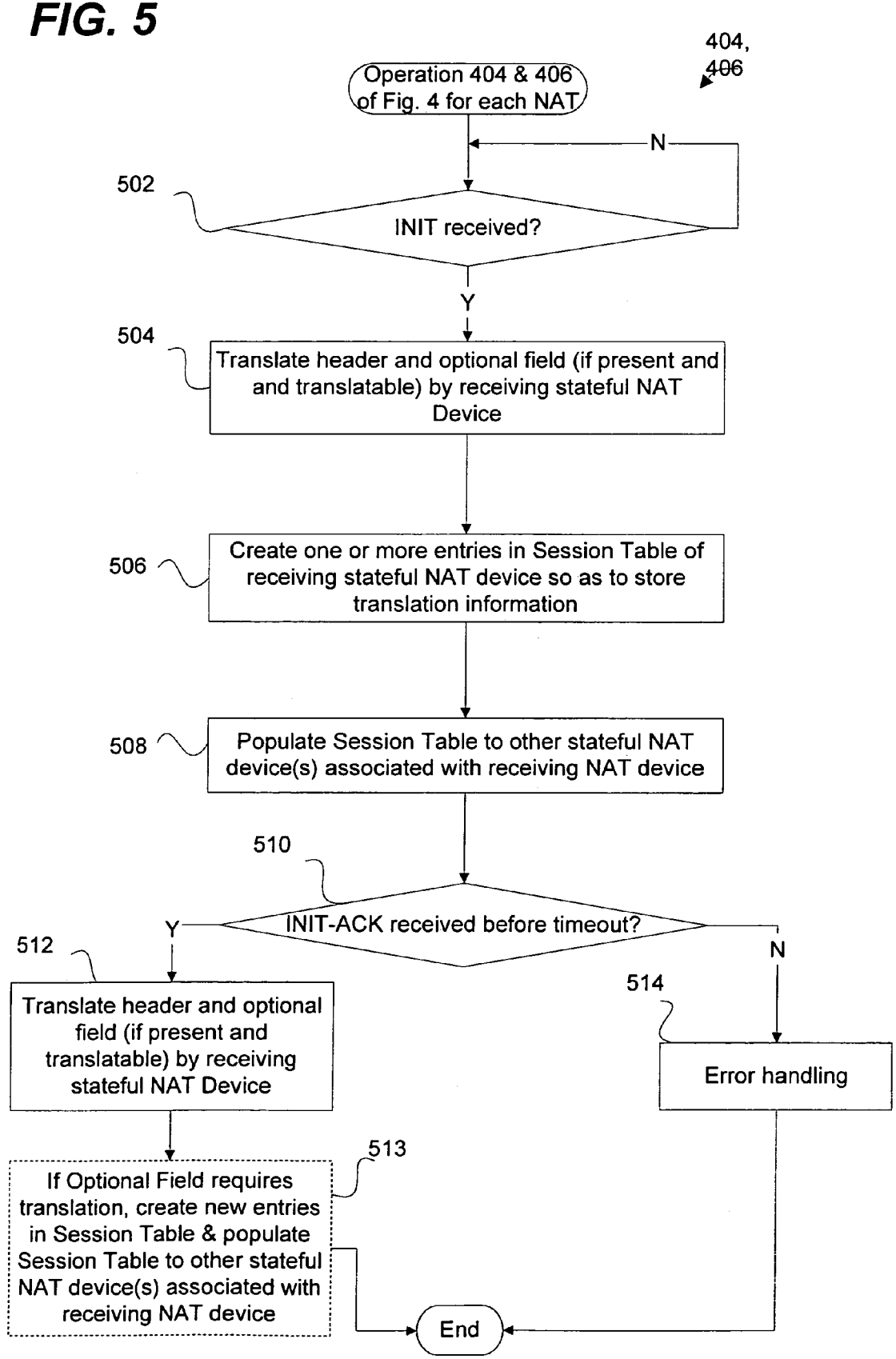
FIG. 5 is a flowchart illustrating operations for handling set up of an SCTP connection in accordance with one implementation of the present invention.

FIG. 5 is a flowchart illustrating operations 404 and 406 of FIG. 4 for handling the set up of an SCTP connection in accordance with one implementation of the present invention. Initially, it is determined whether an INIT message is received in operation 502. If an INIT message is not received, operation 502 is repeated. In other words, each associated stateful NAT waits for an INIT message. When an INIT message is received at a particular stateful NAT device, the header is then translated and the optional field may also be translated if present and if translatable by the receiving stateful NAT device in operation 504.

In the example of FIG. 3, if Host A sends an INIT message to Host B via NAT device 304, the INIT message will contain private source address 10.1.1.1 in the header, as well as multi-homing private addresses 10.1.1.1 and 10.3.1.1 in the optional field. Alternatively, the optional field may include multiple private port numbers which correspond to the same private address. In either case, the multiple private addresses and/or ports, and their corresponding translations, are referred to as multi-homing information. In the later case, the private address 10.1.1.1 in the header and optional field is translated to a public address from the address pool of NAT device 304, such as 170.1.1.1. Note that the NAT device 304 in this example only translates private addresses of format 10.1 to public addresses having format 170.1 and is not configured to translate private addresses having format 10.3. Thus, the private address 10.3.1.1 of the optional field remains untranslated. Of course, the NAT device 304 may be configured to translate privates address of both formats 10.1 and 10.3.

In another example, if Host A sends an INIT message to Host B via NAT device 306, the INIT message will contain private source address 10.3.1.1 in the header, as well as multi-homing private addresses 40.1.1.1 and 10.3.1.1 in the optional field. Since NAT device is configured to translate private address of format 10.3 to a public address of format 190.1, the private address 10.3.1.1 in the header and optional field is translated to a public address from the address pool of NAT device 306, such as 190.1.1.1.

In yet another example, if Host B (instead of Host A) sends an INIT message to Host A via NAT device 304 or 306, the INIT message may contain multi-homing addresses for Host B in the optional field. However, since Host B is on the public interface of either NAT device 304 or 306, translation of either the header or optional field addresses/ports for Host B is not necessary and is not performed. In this case, the receiving NAT device simply translates the public destination address into the corresponding private address for Host A. For example, public destination address 170.1.1.1 is translated into private address 10.1.1.1 by NAT device 304 or public address 190.1.1.1 is translated into private address 10.3.1.1 by NAT device 306. The NAT device would have possession of translation or binding information for the primary private and public address of Host A from a previous DNS query made by Host B to a DNS server (not shown) for Host A's primary IP address. The binding information for the primary private and public addresses may have been stored in a NAT table for the relevant NAT device.

After the translation is performed on the INIT message by the receiving NAT device, an entry may then created in the session table of the receiving stateful NAT device so as to store translation information in operation 506. Example session table entries that correspond to an SCTP connection between Hosts A and B of FIG. 3 are shown in FIG. 6A. As shown, there are two entries, one for each path or multi-homing address of Host A, for the SCTP connection between Hosts A and B.

For the case in which the NAT device which receives the INIT message can only translate one of the multi-homing addresses (or ports), the entry for the untranslatable address may be only partially filled in with the private address and not its corresponding public address. For instance, if NAT 304 receives an INIT message with multi-homing addresses 10.1.1.1 and 10.3.1.1, the second entry of the table in FIG. 6A will only include the private address field 10.3.1.1 but not a corresponding public address value. The public address for the partially filled entry will be completed by the other NAT device 306 when it receives the populated session table from NAT device 304. This completed session table may then be repopulated back to NAT device 304 from NAT device 306.

Referring back to the technique of FIG. 5, the session table is populated to the other stateful NAT devices associated with the receiving NAT device so as to cause other stateful NAT devices associated with the receiving NAT device to create entries in their session tables based on the populated session table from the receiving NAT device in operation 508. The population of the session table from a particular NAT device to other NAT devices associated with the particular NAT device may occur any time the session table is altered, e.g., after a new translation is performed for a particular private address or port which may be used in an SCTP session. Alternatively, only the altered entries are populated.

Population or communication between the stateful NAT devices of the present invention may be accomplished in any suitable manner, such as the hot standby router protocol (HSRP) or implementation of standby and backup modes. In one embodiment, the session table is populated over the TCP connection. Of course any suitable session protocol may be utilized, besides TCP. Additionally, each stateful NAT device is configured so as to know how to communicate with the other associated NAT devices, e.g., each NAT is preconfigured with the IP address(es) of the one or more other NAT device(s).

After populating the session table after translation of the INIT message, it may then be determined whether an INIT-ACK is received before a timeout in operation 510. If a timeout occurs, error handling may then be performed in operation 514 and the procedure ends. If an INIT-ACK message is received before a timeout, the header and optional field (if present and translatable) are then translated by the receiving stateful NAT device in operation 512. If translation of one or more optional field addresses was performed (e.g., the INIT-ACK was sent by Host 302 of FIG. 3), new entries corresponding to the optional field addresses and translations are created in the session table and populated to other NAT devices in optional operation 513. The procedure then ends.

If Host B sends an INIT-ACK message to Host A via NAT device 304, the INIT-ACK message will contain public destination address 170.1.1.1 in the header and no multi-homing information in the optional field since in the illustrated example, Host B is not multi-homed. Public destination address 170.1.1.1 in the header is translated to private address 10.1.1.1 based on the corresponding Session Table entry that belongs to this particular SCTP session. For example, a lookup is performed to find an entry having the source address, destination address, source port, and destination port (TUPLE) of the received INIT-ACK message. Note that since the session table has been preferably populated to the other NAT devices, the INIT and NIT-ACK messages need not be sent through the same NAT device for the addresses and/ports to be translated correctly. However, the session table may be alternatively populated to other NAT devices after handling of the INIT-ACK message since the INIT and INIT-ACK message are unlikely to be received in different NAT devices.

If Host B sends an INIT-ACK message to Host A via NAT device 306, the INIT-ACK message will contain public destination address 190.1.1.1 in the header and no multi-homing information in the optional field since in the illustrated example Host B is not multi-homed. Public destination address 190.1.1.1 in the header is translated to private address 10.3.1.1 based on the corresponding Session Table entry that belongs to this particular SCTP session.

Host B may alternatively be configured with multiple homing addresses. In this example, the optional field of the INIT-ACK message will contain two or more IP addresses for Host B, which Host A may store for later use. Corresponding entries may also be stored for the alternative addresses for Host B. For example, if Host B of FIG. 3 has multi-homing addresses 128.1.1.1 and 128.1.1.2, the entries can look like the session table of FIG. 6B.

In the case where Host A is sending the INIT-ACK message, the source address (or port) and/or optional field addresses (or ports) are translated by the receiving NAT device, rather than the destination address (or port).

Figure 7:
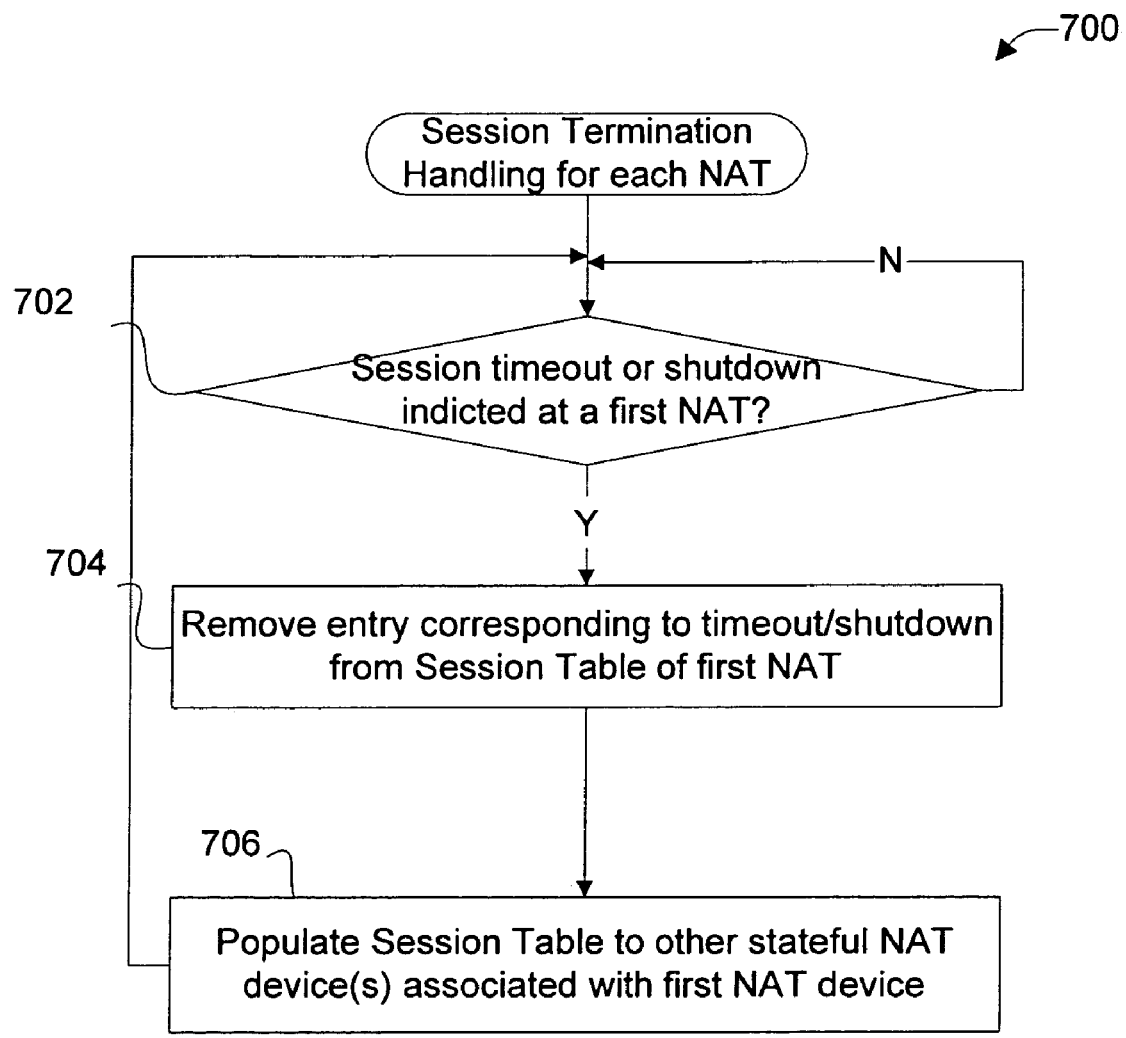
FIG. 7 is a flowchart illustrating a procedure for session termination handling at each stateful NAT device in accordance with one embodiment of the present invention.

FIG. 7 is a flowchart illustrating a procedure 700 for session termination handling at each stateful NAT device in accordance with one embodiment of the present invention. Initially, it is determined whether a session timeout or shut down has been indicated at a first NAT device in operation 702. In one implementation of the SCTP protocol, if there is no communication activity for a particular session for longer than a particular period of time, then a session timeout occurs. In another example, either host may send a shutdown or abort message or the session may be inactive for any number of reasons, such as a downed line or host. If neither a session timeout or shut down has been indicated, the procedure merely waits. When a session timeout or shut down is indicated, the entry corresponding to the timeout or shut down is then removed from the session table of the first NAT device in operation 704. The session table is then populated to other stateful NAT devices associated with the first NAT device so as to cause other stateful NAT devices to remove the entry corresponding to the timeout or shut down from their session tables based on the session table populated by the first NAT device in operation 706. The session termination handling procedure 700 then continues from the beginning.

Generally, the techniques for handling SCTP connections (as well as for translating addresses, protocols, or ports) of the present invention may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the packet processing system (e.g., stateful NAT device) may be implemented on a general-purpose network host machine such as a personal computer or workstation. Further, the invention may be at least partially implemented on a card (e.g., an interface card) for a network device or a general-purpose computing device.

Figure 8:
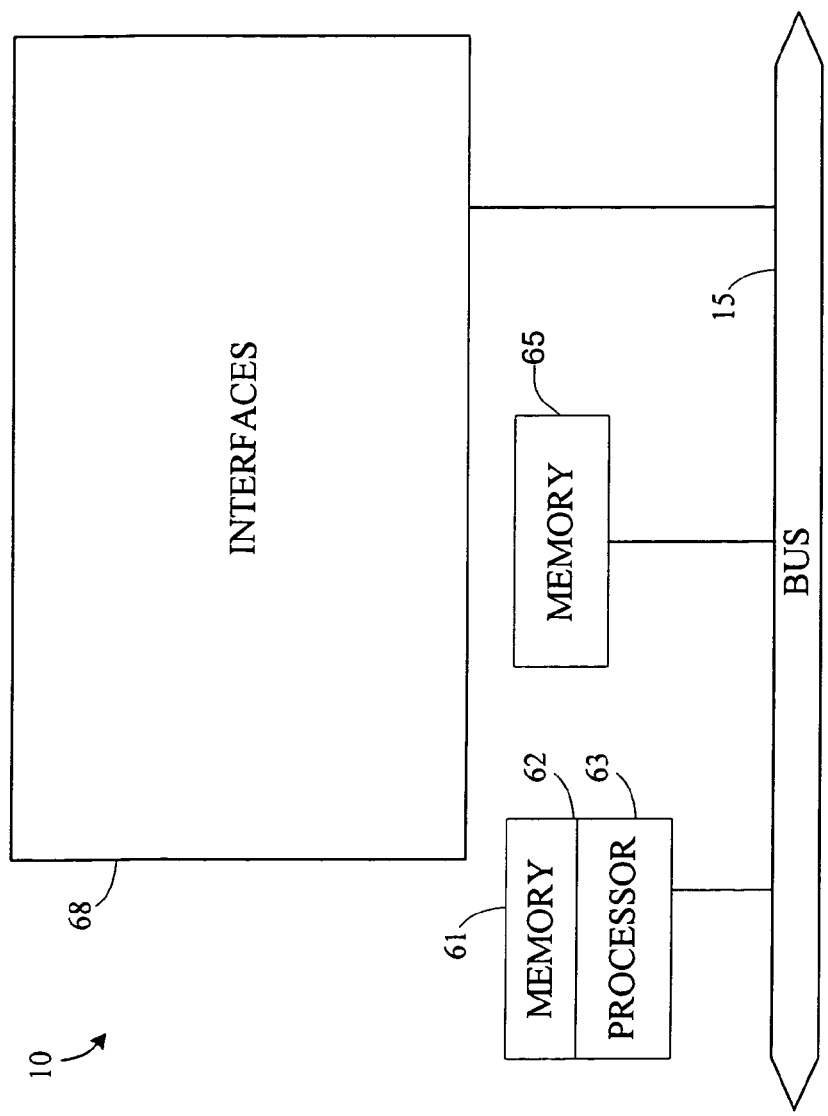
FIG. 8 is a diagrammatic representation of a router in which embodiments of the present invention may be implemented.

Referring now to FIG. 8, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for performing protocol conversions between private and public addresses or ports, between a first and second protocol (e.g., IPv4 and IPv6), storing and populating multi-homing information across multiple NAT devices, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each session, a session table, an address pool table, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for handling Stream Control Transmission Protocol (SCTP) multi-homed connections across multiple translation devices, comprising:
   when an SCTP association between two hosts is being established through a particular translation device, from the particular translation device communicating multi-homing information for a particular one of the hosts to one or more other translation devices associated with the particular translation device so that the one or more other translation devices can store the multi-homing information and when at the one or more other translation devices data is received for the established SCTP association between the two hosts, causing the data to be sent to its intended destination based on the stored multi-homing information, wherein the multi-homing information, which is communicated from the particular translation device to the one or more other translation devices, includes multiple private addresses and/or ports for the particular host and a translation of a first private address or port of the particular host;
   storing the multi-homing information for the particular translation device; and
   when at the particular translation device data is received for the established SCTP association between the two hosts, causing the data to be sent to its intended destination based on the multi-homing information.

2. A method as recited in claim 1, further comprising establishing a transport control protocol (TCP) connection between the particular translation device and the one or more other translation devices prior to the operation of communicating multi-homing information.

3. A method as recited in claim 1, further comprising receiving second multi-homing information, which is communicated from the one or more other translation devices to the particular translation device, wherein the second multi-home information includes multiple private addresses or ports for the particular host and a translation of a second private address or port of the particular host, wherein causing the data to be sent to its intended destination includes translating the first or second private address or port based on the first or second multi-homing information.

4. A method as recited in claim 3, wherein causing the data to be sent to its intended destination includes translating the second private address or port based on the second multi-homing information.

5. A method as recited in claim 1, wherein the multi-homing information includes a private address and a corresponding public address and a plurality of private port numbers and a plurality of corresponding public port values for one of the two hosts.

6. A method as recited in claim 1, further comprising:
   when an INIT message is received at the particular translation device during establishment of the SCTP association between the two hosts, translating the header and optional field of the INIT message if present and translatable by the particular translation device;
   after translation, forwarding the translated INIT message to its intended destination;
   when an INIT-ACK message is received at the particular translation device during establishment of the SCTP association between the two hosts, translating the header and optional field of the INIT-ACK if present and translatable by the particular translation device; and
   after translation, forwarding the translated INIT-ACK message to its intended destination.

7. A method as recited in claim 6, wherein translating the header and optional field of the INIT message and INIT-ACK message are each accomplished by translating between a primary private address and a primary public address and between one or more secondary private addresses and one or more secondary public addresses, wherein the multi-homing information is stored in the form of a first entry in a session table having fields comprising the primary private address and the corresponding primary public address and a second one or more entries comprising the one or more secondary private addresses and the one or more corresponding secondary public addresses, and wherein the multi-homing information is communicated from the particular translation device to the one or more other translation devices by populating the session table from the particular translation device to the one or more other translation devices.

8. A method as recited in claim 6, wherein translating the header and optional field of the INIT message and INIT-ACK message are each accomplished by translating between a primary private port and a primary public port and between one or more secondary private ports and one or more secondary public ports, wherein the multi-homing information is stored in the form of a first entry in a session table having fields comprising the primary private port and the corresponding primary public port and a second one or more entries comprising the one or more secondary private ports and the one or more corresponding secondary public ports, and wherein the multi-homing information is communicated from the particular translation device to the one or more other translation devices by populating the session table from the particular translation device to the one or more other translation devices.

9. A method as recited in claim 1, further comprising when receiving a shutdown or abort message from one of the two hosts for the SCTP association, removing the stored multi-homing information.

10. A computer system operable to handle Stream Control Transmission Protocol (SCTP) multi-homed connections across multiple translation devices, wherein the computer system is in the form of a particular translation device, the computer system comprising:
   one or more processors;
   one or more memory, wherein at least one of the processors and memory are adapted for:
      when an SCTP association between two hosts is being established through the particular translation device, from the particular translation device communicating multi-homing information for a particular one of the hosts to one or more other translation devices associated with the particular translation device so that the one or more other translation devices can store the multi-homing information and when at the one or more other translation devices data is received for the established SCTP association between the two hosts, causing the data to be sent to its intended destination based on the stored multi-homing information, wherein the multi-homing information, which is communicated from the particular translation device to the one or more other translation devices, includes multiple private addresses and/or ports for the particular host and a translation of at least some of such multiple private addresses and/or ports;
      storing the multi-homing information for the particular translation device; and
      when at the particular translation device data is received for the established SCTP association between the two hosts, causing the data to be sent to its intended destination based on the multi-homing information.

11. A computer system as recited in claim 10, wherein at least one of the processors and memory are further adapted for establishing a transport control protocol (TCP) connection between the particular translation device and the one or more other translation devices prior to the operation of communicating multi-homing information.

12. A computer system as recited in claim 10, wherein the at least one of the processors and memory are further adapted for receiving second multi-homing information, which is communicated from the one or more other translation devices to the particular translation device, wherein the second multi-home information includes multiple private addresses or ports for the particular host and a translation of a second private address or port of the particular host, wherein causing the data to be sent to its intended destination includes translating the first or second private address or port based on the first or second multi-homing information.

13. A computer system as recited in claim 12, wherein causing the data to be sent to its intended destination includes translating the second private address or port based on the second multi-homing information.

14. A computer system as recited in claim 10, wherein the multi-homing information includes a private address and a corresponding public address and a plurality of private port numbers and a plurality of corresponding public port values for one of the two hosts.

15. A computer system as recited in claim 10, wherein at least one of the processors and memory are further adapted for:
   when an INIT message is received at the particular translation device during establishment of the SCTP association between the two hosts, translating the header and optional field of the INIT message if present and translatable by the particular translation device;
   after translation, forwarding the translated INIT message to its intended destination;
   when an INIT-ACK message is received at the particular translation device during establishment of the SCTP association between the two hosts, translating the header and optional field of the INIT-ACK if present and translatable by the particular translation device; and
   after translation, forwarding the translated INIT-ACK message to its intended destination.

16. A computer system as recited in claim 15, wherein translating the header and optional field of the NIT message and INIT-ACK message are each accomplished by translating between a primary private address and a primary public address and between one or more secondary private addresses and one or more secondary public addresses, wherein the multi-homing information is stored in the form of a first entry in a session table having fields comprising the primary private address and the conesponding primary public address and a second one or more entries comprising the one or more secondary private addresses and the one or more corresponding secondary public addresses, and wherein the multi-homing information is communicated from the particular translation device to the one or more other translation devices by populating the session table from the particular translation device to the one or more other translation devices.

17. A computer system as recited in claim 15, wherein translating the header and optional field of the INIT message and INIT-ACK message are each accomplished by translating between a primary private port and a primary public port and between one or more secondary private ports and one or more secondary public ports, wherein the multi-homing information is stored in the form of a first entry in a session table having fields comprising the primary private port and the corresponding primary public port and a second one or more entries comprising the one or more secondary private ports and the one or more corresponding secondary public ports, and wherein the multi-homing information is communicated from the particular translation device to the one or more other translation devices by populating the session table from the particular translation device to the one or more other translation devices.

18. A computer system as recited in claim 10, wherein at least one of the processors and memory are further adapted for when receiving a shutdown or abort message from one of the two hosts for the SCTP association, removing the stored multi-homing information.

19. A computer program product for handling Stream Control Transmission Protocol (SCTP) multi-homed connections across multiple translation devices, the computer program product comprising:
   at least one computer readable medium;
   computer program instructions stored within the at least one computer readable product configured for:
      when an SCTP association between two hosts is being established through a particular translation device, from the particular translation device communicating multi-homing information for a particular one of the hosts to one or more other translation devices associated with the particular translation device so that the one or more other translation devices can store the multi-homing information and when at the one or more other translation devices data is received for the established SCTP association between the two hosts, causing the data to be sent to its intended destination based on the stored multi-homing information, wherein the multi-homing information, which is communicated from the particular translation device to the one or more other translation devices, includes multiple private addresses and/or ports for the particular host and a translation of at least some of such multiple private addresses and/or ports;

storing the multi-homing information for the particular translation device; and when at the particular translation device data is received for the established SCTP association between the two hosts, causing the data to be sent to its intended destination based on the multi-homing information.

20. A computer program product as recited in claim 19, wherein the computer program instructions stored within the at least one computer readable product are further configured for establishing a transport control protocol (TCP) connection between the particular translation device and the one or more other translation devices prior to the operation of communicating multi-homing information.

21. A computer program product as recited in claim 19, wherein the computer program instructions stored within the at least one computer readable product are further configured for receiving second multi-homing information, which is communicated from the one or more other translation devices to the particular translation device, wherein the second multi-home information includes multiple private addresses or ports for the particular host and a translation of a second private address or port of the particular host, wherein causing the data to be sent to its intended destination includes translating the first or second private address or port based on the first or second multi-homing information.

22. A computer program product as recited in claim 21, wherein causing the data to be sent to its intended destination includes translating the second private address or port based on the second multi-homing information.

23. A computer program product as recited in claim 19, wherein the multi-homing information includes a private address and a corresponding public address and a plurality of private port numbers and a plurality of corresponding public port values for one of the two hosts.

24. A computer program product as recited in claim 19, wherein the computer program instructions stored within the at least one computer readable product are further configured for:

when an INIT message is received at the particular translation device during establishment of the SCTP association between the two hosts, translating the header and optional field of the INIT message if present and translatable by the particular translation device;

after translation, forwarding the translated INIT message to its intended destination;

when an INIT-ACK message is received at the particular translation device during establishment of the SCTP association between the two hosts, translating the header and optional field of the INIT-ACK if present and translatable by the particular translation device; and after translation, forwarding the translated INIT-ACK message to its intended destination.

25. A computer program product as recited in claim 24, wherein translating the header and optional field of the INIT message and INIT-ACK message are each accomplished by translating between a primary private address and a primary public address and between one or more secondary private addresses and one or more secondary public addresses, wherein the multi-homing information is stored in the form of a first entry in a session table having fields comprising the primary private address and the corresponding primary public address and a second one or more entries comprising the one or more secondary private addresses and the one or more corresponding secondary public addresses, and wherein the multi-homing information is communicated from the particular translation device to the one or more other translation devices by populating the session table from the particular translation device to the one or more other translation devices.

26. A computer program product as recited in claim 24, wherein translating the header and optional field of the INIT message and INIT-ACK message are each accomplished by translating between a primary private port and a primary public port and between one or more secondary private ports and one or more secondary public ports, wherein the multi-homing information is stored in the form of a first entry in a session table having fields comprising the primary private port and the corresponding primary public port and a second one or more entries comprising the one or more secondary private ports and the one or more corresponding secondary public ports, and wherein the multi-homing information is communicated from the particular translation device to the one or more other translation devices by populating the session table from the particular translation device to the one or more other translation devices.

27. A computer program product as recited in claim 19, wherein the computer program instructions stored within the at least one computer readable product are further configured for when receiving a shutdown or abort message from one of the two hosts for the SCTP association, removing the stored multi-homing information.

28. An apparatus for handling Stream Control Transmission Protocol (SCTP) multi-homed connections across multiple translation devices, wherein the apparatus is in the form of a particular translation device, the apparatus comprising:

means for when an SCTP association between two hosts is being established through a particular translation device, from the particular translation device communicating multi-homing information for a particular one of the hosts to one or more other translation devices associated with the particular translation device so that the one or more other translation devices can store the multi-homing information and when at the one or more other translation devices data is received for the established SCTP association between the two hosts, causing the data to be sent to its intended destination based on the stored multi-homing information, wherein the multi-homing information, which is communicated from the particular translation device to the one or more other translation devices, includes multiple private addresses and/or ports for the particular host and a translation of at least some of such multiple private addresses and/or ports;

means for storing the multi-homing information for the particular translation device; and means for when at the particular translation device data is received for the established SCTP association between the two hosts, causing the data to be sent to its intended destination based on the multi-homing information.

* * * * *